US008417673B2

(12) United States Patent
Stakutis et al.

(10) Patent No.: US 8,417,673 B2
(45) Date of Patent: Apr. 9, 2013

(54) METHOD, SYSTEM, AND PROGRAM FOR RETAINING VERSIONS OF FILES

(75) Inventors: Christopher John Stakutis, Concord, MA (US); Kevin Michael Stearns, Maynard, MA (US)

(73) Assignee: International Business Machines Corporation, Armonk, NY (US)

( * ) Notice: Subject to any disclaimer, the term of this patent is extended or adjusted under 35 U.S.C. 154(b) by 1742 days.

(21) Appl. No.: 10/680,953

(22) Filed: Oct. 7, 2003

(65) Prior Publication Data

US 2005/0076066 A1 Apr. 7, 2005

(51) Int. Cl.
*G06F 7/00* (2006.01)
*G06F 17/30* (2006.01)

(52) U.S. Cl.
USPC .................... 707/662; 707/813; 707/741

(58) Field of Classification Search .............. 707/1, 101, 707/204, 205, 202, 203, 2, 662, 813, 741; 715/511
See application file for complete search history.

(56) References Cited

U.S. PATENT DOCUMENTS

| | | | |
|---|---|---|---|
| 5,276,867 A | 1/1994 | Kenley et al. | |
| 5,438,661 A | 8/1995 | Ogawa | |
| 5,457,796 A | 10/1995 | Thompson | |
| 5,463,772 A | 10/1995 | Thompson et al. | |
| 5,495,603 A | 2/1996 | Fruchtman et al. | |
| 5,495,607 A | 2/1996 | Pisello et al. | |
| 5,678,042 A | 10/1997 | Pisello et al. | |
| 5,764,972 A * | 6/1998 | Crouse et al. | 707/1 |
| 5,806,078 A * | 9/1998 | Hug et al. | 715/511 |
| 5,813,009 A | 9/1998 | Johnson et al. | |
| 5,819,295 A * | 10/1998 | Nakagawa et al. | 707/203 |
| 5,878,410 A * | 3/1999 | Zbikowski et al. | 707/2 |
| 5,925,126 A | 7/1999 | Hsieh | |

(Continued)

FOREIGN PATENT DOCUMENTS

| | | |
|---|---|---|
| EP | 0 947 932 | 10/1999 |
| JP | 10143407 | 5/1998 |
| JP | 2001075786 | 3/2001 |
| WO | WO-00/57275 | 9/2000 |

OTHER PUBLICATIONS

U.S. Appl. No. 10/681,557, filed Oct. 7, 2003, entitled "Method, System, and Program for Processing a File Request", by C. J. Stakutis and W. R. Haselton.

(Continued)

*Primary Examiner* — Usmaan Saeed
*Assistant Examiner* — Paul Kim
(74) *Attorney, Agent, or Firm* — David W. Victor; Konrad, Raynes, Davda and Victor LLP

(57) ABSTRACT

Provided are a method, system, and program for processing a request to write to a source file in a storage system. A determination is made as to whether a retention rule is provided for the source file. In response to determining that one retention rule is provided for the source file, a versioned file name is generated, wherein a versioned file comprises the source file at a point-in-time. A command is transmitted to a file system to copy the source file data to a versioned file having the generated versioned file name and the generated versioned file name is added to a retention index file. The retention index file is processed to determine whether to purge versioned files according to the retention rule provided for the source file.

34 Claims, 5 Drawing Sheets

U.S. PATENT DOCUMENTS

| | | | |
|---|---|---|---|
| 5,991,753 A | 11/1999 | Wilde | |
| 6,098,079 A * | 8/2000 | Howard | 707/205 |
| 6,240,421 B1 | 5/2001 | Stolarz | |
| 6,321,219 B1 | 11/2001 | Gainer et al. | |
| 6,336,120 B1 | 1/2002 | Noddings et al. | |
| 6,438,642 B1 | 8/2002 | Shaath | |
| 6,546,404 B1 | 4/2003 | Davis et al. | |
| 6,549,916 B1 | 4/2003 | Sedlar | |
| 6,901,418 B2 * | 5/2005 | Gonos | 707/204 |
| 6,922,708 B1 * | 7/2005 | Sedlar | 707/202 |
| 6,928,447 B2 * | 8/2005 | Kaler et al. | 707/101 |
| 7,225,208 B2 * | 5/2007 | Midgley et al. | 707/204 |
| 2001/0044904 A1 | 11/2001 | Berg et al. | |
| 2002/0046320 A1 | 4/2002 | Shaath | |
| 2002/0133738 A1 | 9/2002 | Zeigler et al. | |
| 2002/0166079 A1 | 11/2002 | Ulrich et al. | |
| 2002/0174329 A1 | 11/2002 | Bowler et al. | |
| 2003/0070071 A1 | 4/2003 | Riedel et al. | |

OTHER PUBLICATIONS

U.S. Appl. No. 10/681,558, filed Oct. 7, 2003, entitled "Method, System, and Program for Archiving Files", by C. J. Stakutis, W. R. Haselton, K. M. Stearns, A. L. Stuart, and T. L. Marek.

* cited by examiner

Retention Rule

Versioned File Name

METHOD, SYSTEM, AND PROGRAM FOR RETAINING VERSIONS OF FILES

BACKGROUND OF THE INVENTION

1. Field of the Invention

The present invention is related to a method, system, and program for retaining versions of files.

2. Description of the Related Art

Users may maintain copies of different versions of a file in order to allow the user to revert back to a previous version, such as versions between scheduled backups. The user may have to install a storage management application to manage versions of a file. Such storage management applications typically utilize customized graphical user interfaces (GUIs) and application program interfaces (APIs) to interface with the operating system to perform version management related operations. Users may have to undergo significant training to learn to use these different application programs, which are often complex, especially in enterprise computing environments, to manage saved versions of a document.

SUMMARY OF THE PREFERRED EMBODIMENTS

Provided are a method, system, and program for processing a request to write to a source file in a storage system. A determination is made as to whether a retention rule is provided for the source file. In response to determining that one retention rule is provided for the source file, a versioned file name is generated, wherein a versioned file comprises the source file at a point-in-time. A command is transmitted to a file system to copy the source file data to a versioned file having the generated versioned file name and the generated versioned file name is added to a retention index file. The retention index file is processed to determine whether to purge versioned files according to the retention rule provided for the source file.

In further implementations, purging the versioned files comprises determining versioned files to purge according to the retention rule, deleting the determined versioned file names from the retention index file, and transmitting a command to the file system to delete versioned files having the determined versioned file names.

Still further, processing the retention index file to determine whether to purge versioned files according to the retention rule may further comprise sorting the versioned file names for the source file in the retention index file ordered on a timestamp included in the versioned file names and selecting versioned files from the sorted versioned file names to purge.

In still further implementations, the operations of processing the request, determining whether one retention rule is provided, generating a new versioned file name, transmitting the command, adding the generated versioned file name to the retention index file and processing the retention index file are performed by a host system and wherein the versioned file, source file, and file system are on a remote storage system. In such implementations, the retention index files may be maintained at local storage to the host system and accessed locally by the host system to determine versioned files to purge according to retention rules.

Still further, the processing of the write request and the retention rules may be performed by a program executing in a kernel of an operating system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
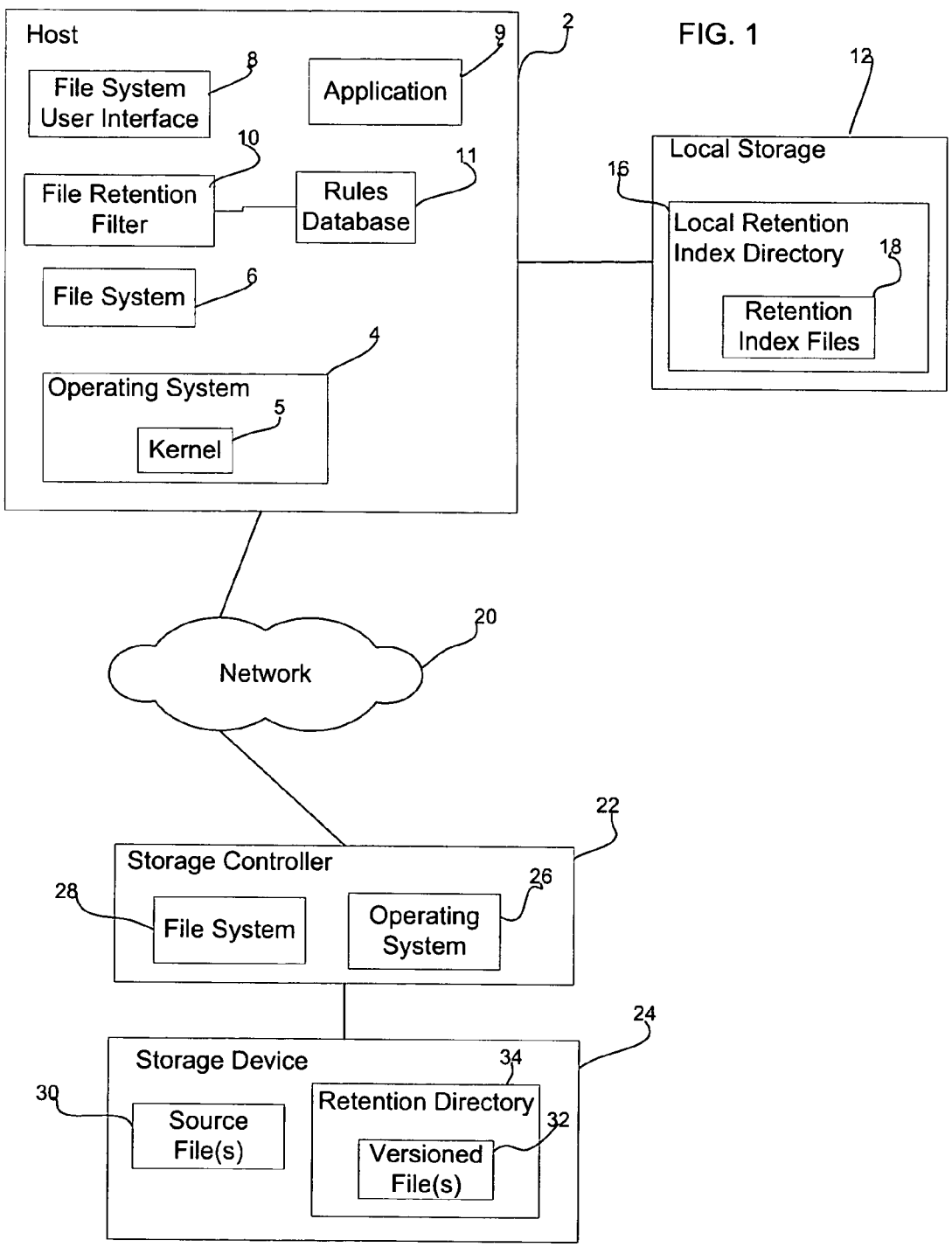
FIG. 1 illustrates a computing environment in which embodiments of the invention are implemented.

FIG. 1 illustrates a network computing environment in which embodiments of the invention may be implemented. A host system 2 includes an operating system 4 and a file system 6 that provides an organization of files stored in a storage device. The file system 6 may provide a hierarchical tree-like arrangement of files, which may involve the use of directories and subdirectories in which the files may be stored, where any directory may comprise a subdirectory of another directory or the root directory. A file system user interface 8 provides a command line or graphical user interface to enable the user to explore the file system and perform file system related operations, such as moving a file to a specified directory, deleting a file, renaming a file, creating a file, etc. The file system user interface 8 may comprise a file management program that renders a presentation of the hierarchical arrangement of files. The file system user interface 8 may comprise a stand alone file management program or a file management function accessed through an application program. A local storage device 12 is accessible to the host system 2, and may comprise an internal hard disk drive accessible over a host system 2 bus or external storage attached directly to the host 2 or at a proximate distance over a network.

The host 2 system may communicate I/O requests over network 20 to a storage controller 22 directed to files in storage device 24. The storage controller includes an operating system 26 and file system 28 to manage files in the storage device 24. The storage controller 22 may comprise a server class computing device, an enterprise storage server, Network Attached Storage (NAS), etc. The storage device 24 may be internal to the enclosure including the storage controller 22 or in a separate enclosure coupled to the storage controller 22. The storage device 24 maintains source files 30, which are the files that the host application program 9 and file system user interface 8 would directly update and versioned files 32, which comprise different versions of the source files 30 that are generated when the source files 30 are updated. The versioned files 32 may be maintained in a separate retention directory 34 in the storage file system 28, where there may be a separate subdirectory for each source file for which versions are maintained. In this way, the versioned files are accessible through a general file system without the need to install and learn to use a special purpose storage management program.

The host system 2 further includes a file retention filter 10 program that intercepts user requests to write to an existing source file 30 from the file system user interface 8 or from an application program 9 which directs writes to the file system 6. The application program 9 may comprise any application program known in the art, e.g., a database program, word processing program, spreadsheet program, etc. In certain embodiments, the filter 10 executes in a kernel 5 of the operating system 4 as a high priority task.

The host file system 6 would communicate I/O requests over the network 20 to the storage file system 28 to access source files 30 stored in the storage device 24. The rules database 11 provides a list of one or more retention rules to apply to certain specified source files 30. The rules database 11 may be implemented in any data structure known in the art, such as an ASCI text file, an Extensible Markup Language (XML) file, or relational database. The file retention filter 10 would access the rules database 11 when filtering file operations to determine whether a retention rule applies to the source file 30 being updated. In certain implementations, the rules database 11 maintains versioning rules for different files for use by the file system 6, so that a separate database program and interface is not needed to manage the different versions.

The host local storage 12 maintains a local retention index directory 16 including information on versioned files 32 stored in the remote storage device 24 that is used by the file retention filter 10 when applying retention policies.

The host system 2 may comprise any computing device known in the art, such as a server class machine, workstation, desktop computer, laptop, handheld computer, telephony device, etc. The storage device 24 may comprise any storage device known in the art, such one or more interconnected disk drives configured as a Redundant Array of Independent Disks (RAID), Just a Bunch of Disks (JBOD), Direct Access Storage Device (DASD), as a tape storage device, e.g., a tape library, a virtualization device, one or multiple storage units, or etc. The network 20 may comprise any network known in the art, e.g., Wide Area Network (WAN), Storage Area Network (SAN), the Internet, and Intranet, wireless network, etc. Alternatively, the host system 2 may connect to the storage system 24 over a bus interface.

In implementations where the file retention filter 10 executes in the kernel 5 of the operating system 4, the operations of the file retention filter 10 remain transparent to the user and the user is unaware of the rule based checking and file retention management operations the file retention filter 10 performs as an extension of the operating system 4. Such implementations allow for versioning at the file system level, so that a separate database program and interfaces are not needed to manage versions of the source files. Further, in certain implementations, the file retention filter 10 extension for the file system 6 may be written for different operating systems and file systems. In this way, the file retention filter 10 would perform the same functions and operate in a similar manner across file systems, thereby standardizing the filter operations across operating system platforms and providing a similar user interface to allow the user to create rules to control the filtering operations regardless of the operating system and file system in which the user is operating.

Figure 2:
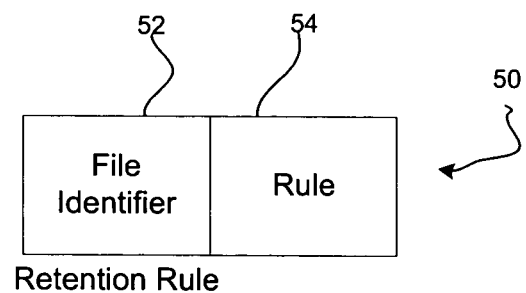
FIG. 2 provides information maintained in a file retention rule in accordance with implementations of the invention.

FIG. 2 illustrates a rule entry 50 in the rule database 11. Each rule entry may indicate:

file identifier 52: a name of the file to which the retention rule applies. Alternatively, the file identifier may identify an application or user that generated the file, so that the retention policy would apply to all files generated by that application or user.

Retention rule 54: specifies one or more retention rules.

The retention rule 54 can indicate a maximum number of versions of a source file 30, i.e., versioned files 32, to main-tain. Alternatively, the retention rule 54 can specify a maximum number of versioned files 32 for one source file 30 to maintain within a given time period, or different maximum number of versioned files to maintain for different time periods. For instance, a rule can specify a maximum number of versioned files for one source file to maintain over a specified time period, such as no more than three file versions per day and no file versions older than one day. The rule may also specify a time cut-off for versioned files, such that versioned files whose timestamp 64 exceeds the time cut-off are removed.

Alternatively, the rule may specify a different number of versioned files to retain for different time periods, so that a set of versioned files are maintained for each specified time periods, independent of other time periods. For instance, the retention rule 54 may specify one maximum number, e.g., 5, for the past hour, another maximum number, e.g., 3, for the past day, another maximum number for the past week, e.g., 2, etc. Such a rule would cause the filter 10 to separately maintain five versioned files 32 for the past hour, three for the past day, two for the past week, etc. Such a rule may be desired because the user may want a specific version over a more recent period, such as the past hour, but may need only a general version over a longer time period, such as a day, week, month, year, etc. In this way, a multi-time period retention rule satisfies such retention needs.

The file retention filter 10 would cause the storage of versioned files 32 in the storage device 24, which may comprise a remote storage device, that are maintained by the storage file system 28. As discussed, the source 30 and versioned 32 files may be maintained in the same storage device 24 or separate storage devices. The file retention filter 10 further maintains information on the versioned files 32 stored in the storage device 34 in retention index files 18 that are stored in a local retention index directory 16 that may be quickly accessed by the host 2 because it is maintained in local storage 12, such as an attached storage device (external or internal) or proximate storage device in a network. The local retention index directory 18 maintains one ore more retention index files 16, where each index file 16 may include the names of versioned files for one or more source files.

Figure 3:
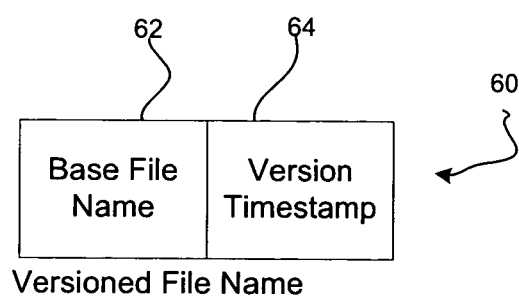
FIG. 3 illustrates information maintained in a versioned file name used with implementations of the invention.

FIG. 3 illustrates the format of the name of each versioned file 32, which would be recorded in the retention index file 16. The versioned file name 60 includes a base file name 62 component comprising the full or partial name of the source file being retained and a version timestamp 64 indicating the version. The version timestamp 64 may be a system timestamp generated by a system clock or a version number incremented from a previous file version number of the most recently retained versioned file.

Figure 4:
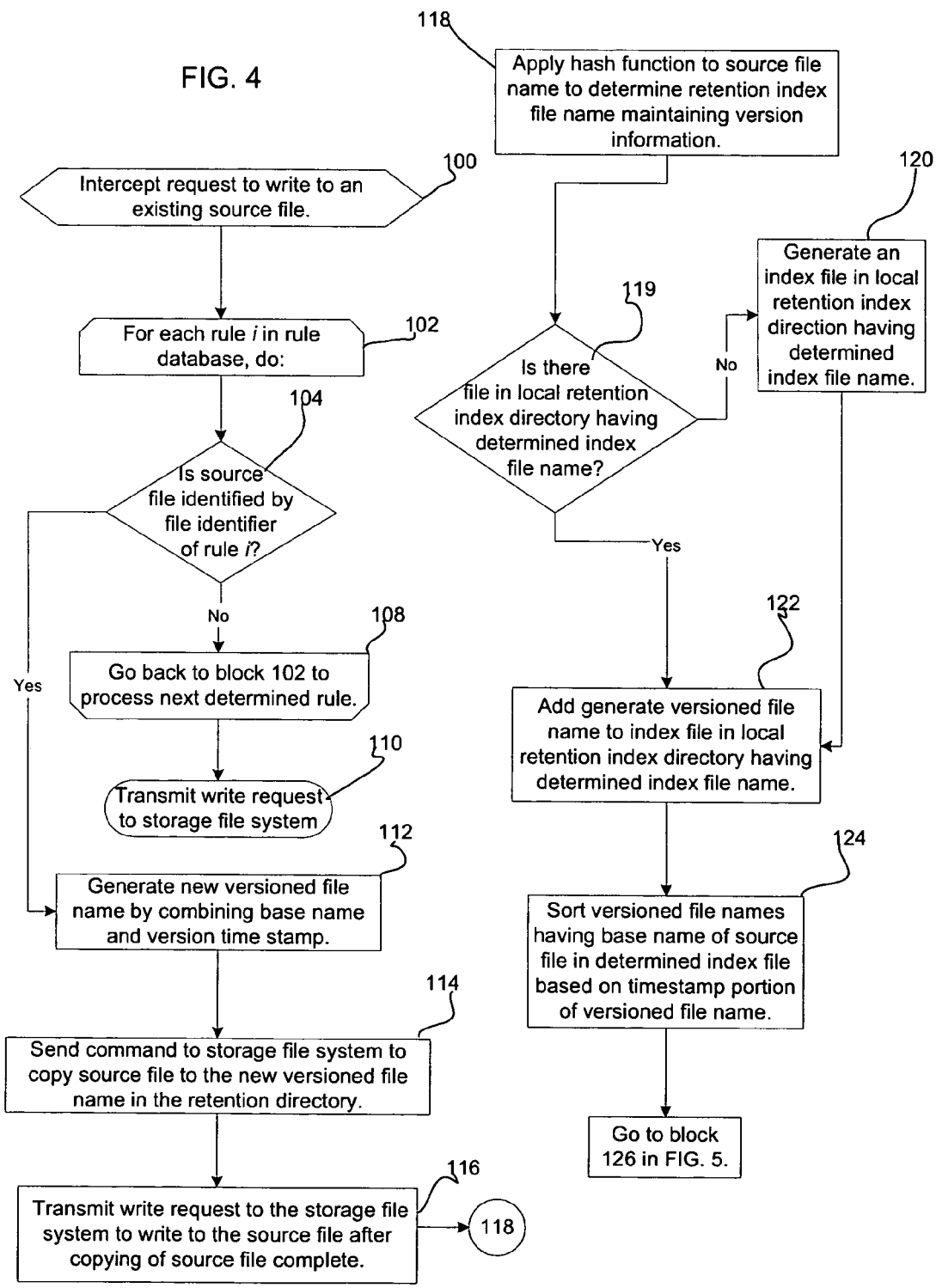
FIGS. 4 and 5 illustrate file retention operations in accordance with implementations of the invention.
Figure 5:
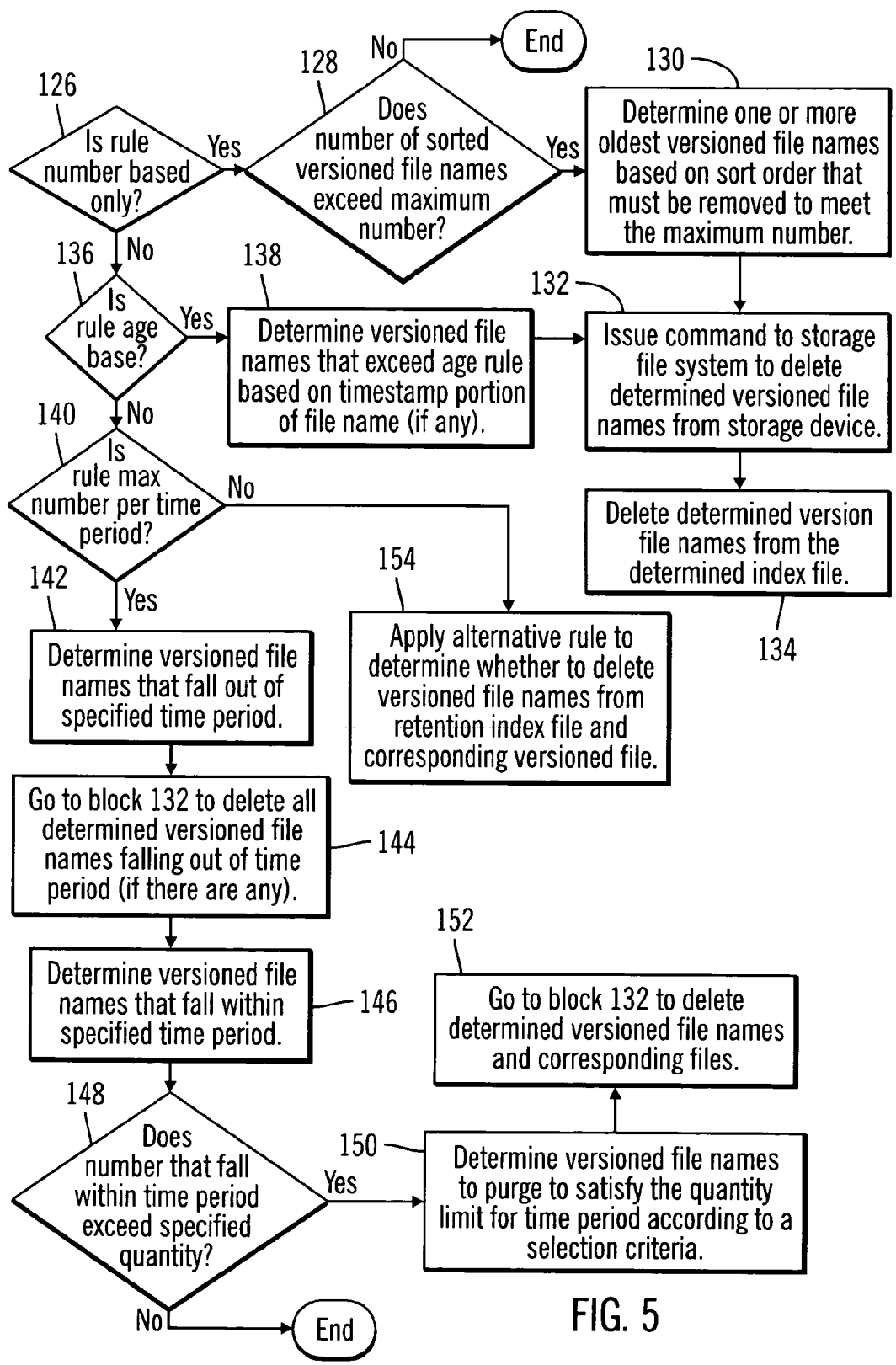

FIGS. 4 and 5 illustrates operations performed by the file retention filter 10 in response to receiving a request to write to an existing source file 30 in the storage device 24. With respect to FIG. 4, in response to intercepting the write request (at block 100), a loop is performed at blocks 102-108 for each retention rule i in the rules database 11. A determination is made (at block 104) whether the source file 30 to update is identified by the file identifier 52 of rule i. For instance, if the file identifier 52 specifies a file name, then the rule i applies to the source file having the name of the file identifier. Alternatively, if the file identifier 52 specifies a source application or user that generated the update or created the file, then rule i applies to the source file having the source application and/or user specified in file identifier 52. If (at block 104) the rule i does not apply according to the file identifier, then control proceeds (at block 108) back to block 102 to consider the next rule. If no rule in the rules database 11 applies, then the file retention filter 10 transmits (at block 110) the write request to the storage file system 28 in the storage controller 22 to apply the write to the source file 30 in the storage device 24.

If (at block 104) the rule i does apply, then the file retention filter 10 generates (at block 112) a new versioned file name by combining the base name of the source file 30 with a generated version time stamp 64 (FIG. 3). The version time stamp 64 may be generated based on a system clock time or may be determined by incrementing the timestamp for the most recent versioned file 32 for the source file. The file retention filter 10 then sends (at block 114) a command to the storage file system 28 to copy the source file 30 to the new versioned file name in the retention directory 34. After the copying of the content of the source file 30 to the new versioned file 32 completes, then the write request is transmitted (at block 116) to the storage file system 28 to apply the update to the source file 30.

To manage the number of versioned files, the file retention filter 10 applies (at block 118) a hash function to the name of the source file 30 to determine a retention index file 18 name in the local retention index directory 16 maintaining information on the versioned files for the one or more source files whose name hashes to the retention index file name 18. The hash may be applied to the full path name of the source file 30 or the file name only. Further, since different source file names may hash to the same retention index file 18 name, one retention index file 18 may maintain information on versioned files, i.e., versioned file names, for different source files 30. If (at block 119) there is no file in the local retention index directory 16 having the determined index file name, i.e., there are no versioned instances of the source file whose name hashes to that determined index file name, then the file retention filter 10 generates (at block 120) a new retention index file 18 in the local retention index directory 16 having the determined retention index file name. If (at block 119) there is one retention index file 18 having the determined retention index file name or one was added (at block 120), then the generate versioned file name is added (at block 122) to the retention index file 18 having the determined index file name in the local retention index directory 16. In this way, information on the versioned files 32 for the source files 30 is maintained in the retention index files in local storage, where local storage may comprise a relatively fast access storage, such as an internal hard disk drive, external storage attached directly to the host via a bus interface, or a proximate network storage device.

After adding the name of the new versioned file to the retention index file 18 for the source file, i.e., hashing to the index file name, a determination must be made if versioned files 32 for the source file 30 need to be purged. The file retention filter 10 (at block 124) sorts the versioned file names having the base name 62 (FIG. 3) of the source file in the determined retention index file 18 according to an order based on the timestamp portion 64 of the versioned file. Control then proceeds to block 126 in FIG. 5 to determine whether a retention policy rule indicates that versioned files need to be purged. If (at block 126) the retention rule i is a maximum number based rule, i.e., versioned files for a source must be purged if they exceed a maximum number, and if (at block 128) the number of sorted versioned file names exceeds the maximum number, then the file retention filter 10 determines (at block 130) from the retention index file 18 one or more of the oldest versioned files based on the sort order on the timestamp 64 that must be purged to meet the maximum number limit on versioned files. A command is then issued (at block 132) to the storage file system 28 to delete the versioned files 32 having the determined versioned file names from the storage device 34. Further, the determined old version file names are deleted (at block 134) from the retention index file 18 for the source file, so that the purging is reflected in the local retention index file 18 for the source file 30. In this way, the local retention index directory 16 and retention index files therein are used to allow the host system 2 to quickly determine versioned files that need to be removed without having to scan files at the remote storage device 30. Such remote scanning can have significant latency depending on network 20 traffic and the load on the storage controller 22.

If (at block 136) the rule is age based, then the file retention filter 10 determines (at block 138) versioned file names that exceed the age rule based on the timestamp portion of the file name (if any) and then proceeds to block 132 to issue a command to delete the determined versioned file names from the retention index file 18 and the actual corresponding versioned files 32 in the retention directory 34 in the storage device 24 to remove those versioned files 32 whose timestamp exceeds the age rule.

If (at block 140) the retention rule specifies a maximum number of versioned files for a specified time period, then the file retention filter 10 determines (at block 142) the versioned file names of the sorted names that fall out of the specified time period based on the version timestamp 64 portion of the sorted versioned file names. Control then proceeds (at block 144) to block 132 to delete all the determined versioned file names falling outside of the specified time period (if there are any) from the retenton index file 18 and delete the actual versioned files 32 having the determined names from the storage device 14. The file retention filter 10 further determines (at block 146) the sorted versioned file names that fall within the specified time period. If (at block 148) the number of determined versioned file names that fall within the specified time period exceed the specified maximum number specified in the retention rule i, then the file retention filter 10 determines (at block 150) versioned file names that fall within the time period to purge to satisfy the maximum number limit for the time period according to a selection criteria. The selection criteria for the rule i may specify to purge the oldest versioned files based on the timestamp 64, or delete certain files within the specified time period so the files remaining within the time period have timestamps 64 distributed throughout the time period. Control then proceeds (at block 152) to block 132 to delete the determined versioned file names within the time period and the corresponding versioned files 32 in the storage device 24. As discussed, certain retention rules may separately maintain versioned files for different time periods. In such case, the file retention filter 10 would consider the versioned files for each time period to determine whether versioned files for a specific time period need to be purged.

Any alternative retention rules would be applied (at block 154) to determine whether to delete versioned file names from the retention index file 18 and the corresponding versioned files from the storage device 24. Further, if the number of versioned file names in the retention file index 18 for the source file 30 do not exceed the number and/or age limits, then no purging would be performed with respect to the retention file index 18.

The described implementations provide techniques to allow file retention policies to be implemented at a local host system with respect to source files and the versioned files of the source files that are stored on a remote computer. Further, in certain implementations, the file retention management operations are implemented as an extension of the file system. The file retention filter maintains a database of rules and versioned files using local file system constructs, thereby, in certain implementations, avoiding the need to install and use a separate database application program and interfaces to manage and maintain versioned files.

Additional Implementation Details

The file retention operations described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described implementations, the file retention rules are defined in a rule database. In alternative implementations, the file retention rules may be defined with attributes associated with a file or directory, so that the rule applies to the file or all files in a directory. For instance, the user may associate a file retention rule with the attributes defined for a directory of the file system. In certain operating systems, such as the MICROSOFT WINDOWS operating system, the attributes that may be assigned to a directory are accessed by right clicking a mouse button over the name of the directory displayed in a user interface window to display a menu, and then selecting the properties option displayed in the menu. (Microsoft and Windows are registered trademarks of Microsoft Corporation).

In certain described implementations, the file retention filter 10 is shown as a separate program component. The file retention filter 10 may be installed separately from the file system 6, such as a separately installed application program that runs when the operating system 4 and file system 6 are initialized and screens files the user is attempting to modify or move. Alternatively, the functionality of the file filter may be incorporated directly into the operating system and be made available as a feature of the file system installed with the operating system.

In described implementation, the rules database 11 is implemented in a file and information on versioned files is maintained in files in the file system. In alternative implementations, the file system may issue function calls to a separate installed application program, such as a database program, to determine information on versioned files, where such separately installed application program would maintain information on versioned files.

FIGS. 4 and 5 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 6:
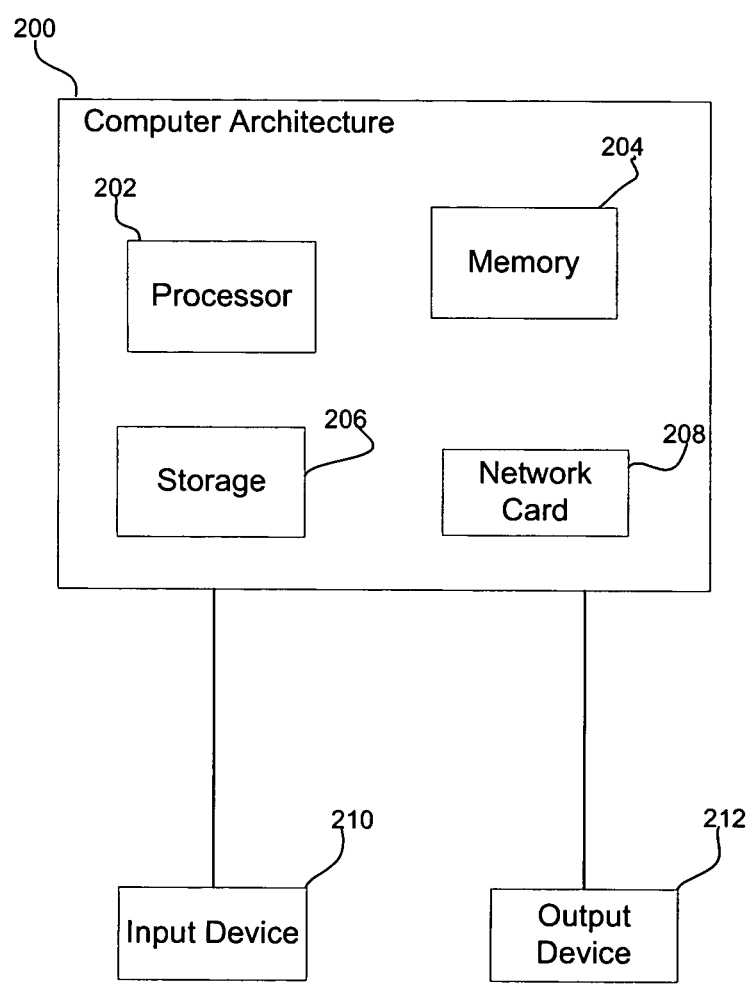
FIG. 6 illustrates a computing architecture that may be used to implement the computing environment described with respect to FIG. 1.

FIG. 6 illustrates one implementation of a computer architecture 200 of the host system 2 shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:

intercepting, with a filter program, a request from an application or file system user interface to write to a source file in a remote file system for a remote storage system accessible over a network;

determining, by the filter program, whether a retention rule is provided for the source file in response to the write request;

in response to determining that one retention rule is provided for the source file, generating, by the filter program, a versioned file name, wherein a versioned file comprises the source file at a point-in-time;

transmitting, by the filter program, a command to the remote file system to copy the source file data to a versioned file having the generated versioned file name;

applying, by the filter program, a function to a source file name of the source file to determine a retention index file, wherein the determined retention index file maintains names of versioned files for the source file to which the function is applied;

adding, by the filter program, the generated versioned file name to the determined retention index file indicating versioned files for the source file in the remote file system;

determining, by the filter program, from the retention index versioned files for the source file to purge in response to determining that the retention rule indicates a maximum number of versioned files for the source file and the versioned files for the source file do not satisfy the retention rule;

determining, by the filter program, from the retention index versioned files for the source file to purge in response to determining that the retention rule indicates a time limit of versioned files for the source file and the versioned files for the source file do not satisfy the retention rule;

transmitting, by the filter program, a command to the remote file system to purge the determined versioned files at the remote storage system; and transmitting, by the filter program, the write to the source file to the remote file system in response to determining that no retention rule is provided for the source file, wherein the remote file system applies the write to the source file at the remote storage system.

2. The method of claim 1, further comprising:

deleting, by the filter program, the versioned file names for the determined versioned files to purge from the retention index file, wherein the command to purge is issued by transmitting the command to the remote file system to delete versioned files at the remote storage system having the determined versioned file names.

3. The method of claim 1, wherein the function comprises a hash function, and wherein one retention index may maintain versioned file names for multiple source files to which the function is applied.

4. The method of claim 1, wherein determining from the retention index file the versioned files to purge further comprises:

sorting the versioned file names for the source file in the retention index file ordered on a timestamp included in the versioned file names; and selecting versioned files from the sorted versioned file names to purge.

5. The method of claim 4, wherein determining from the retention index versioned files for the source file to purge in response to determining that the retention rule indicates a maximum number of versioned files for the source file comprises:

determining whether a number of the sorted versioned file names exceeds the maximum number; and selecting a number of oldest sorted versioned file names to purge to reduce the number of versioned file names in the retention index file to reach the maximum number.

6. The method of claim 4, wherein determining from the retention index versioned files for the source file to purge in response to determining that the retention rule indicates the time limit of versioned files for the source file and the versioned files for the source file do not satisfy the retention rule comprises:

determining whether sorted version file names exceed the time limit according to the timestamp for the sorted versioned file names; and selecting versioned file names in the retention index whose timestamp exceeds the time limit to purge versioned files whose timestamp exceeds the time limit.

7. The method of claim 1, further comprising:

determining, by the filter program, from the retention index versioned files for the source file to purge in response to determining that the retention rule specifies a time period and maximum number of versioned files to maintain for the source file within the specified time period and the versioned files for the source file do not satisfy the retention rule.

8. The method of claim 7, wherein the retention rule specifies multiple time periods and one maximum number for each time period to separately maintain versioned files for the source file for different time periods, wherein the determining whether the number of versioned files to maintain for the source file exceeds the specified maximum number is performed for each specified time period, and wherein selecting the number of oldest versioned file names to purge to reduce the number of versioned file names in the retention index file is performed for each specified time period to reach the maximum number specified for the time period.

9. The method of claim 1, wherein the filter program executes in a host system in communication with the remote storage system over the network.

10. The method of claim 9, wherein retention index files are maintained at local storage to the host system and accessed locally by the filter program to determine versioned files to purge according to retention rules.

11. The method of claim 1, wherein the filter program executes in a kernel of an operating system.

12. The method of claim 1, wherein the retention rule identifies a name of one source file to which the rule applies or identifies a source that created the source file to which the rule applies.

13. A system in communication with a remote file system for a remote storage system accessible over a network, comprising:

a first storage system including source files;

a second storage system including retention rules for the source files;

a file system;

a file retention filter enabled to cause operations to be performed, the operations comprising:

intercepting a request from an application or file system user interface to write to a source file in the remote file;

determining whether a retention rule is provided for the source file in response to the write request;

in response to determining that one retention rule is provided for the source file, generating a versioned file name, wherein a versioned file comprises the source file at a point-in-time;

transmitting a command to the remote file system to copy the source file data to a versioned file having the generated versioned file name;

applying a function to a source file name of the source file to determine a retention index file, wherein the determined retention index file maintains names of versioned files for the source file to which the function is applied;

adding the generated versioned file name to the determined retention index file;

determining from the retention index versioned files for the source file to purge in response to determining that the retention rule indicates a maximum number of versioned files for the source file and the versioned files for the source file do not satisfy the retention rule;

determining from the retention index versioned files for the source file to purge in response to determining that the retention rule indicates a time limit of versioned files for the source file and the versioned files for the source file do not satisfy the retention rule;

transmitting a command to the remote file system to purge the determined versioned files at the remote storage system; and transmitting the write to the source file to the remote file system in response to determining that no retention rule is provided for the source file, wherein the remote file system applies the write to the source file at the remote storage system.

14. The system of claim 13, wherein the operations further comprise:

deleting the versioned file names for the determined versioned files to purge from the retention index file, wherein the command to purge is issued by transmitting the command to the remote file system to delete versioned files at the remote storage system having the determined versioned file names.

15. The system of claim 13, wherein the function comprises a hash function, and wherein one retention index may maintain versioned file names for multiple source files to which the function is applied.

16. The system of claim 13, wherein the determining from the retention index file the versioned files to purge further comprises:

sorting the versioned file names for the source file in the retention index file ordered on a timestamp included in the versioned file names; and selecting versioned files from the sorted versioned file names to purge.

17. The system of claim 16, wherein the determining from the retention index versioned files for the source file to purge in response to determining that the retention rule indicates a maximum number of versioned files for the source file comprises:

determining whether a number of the sorted versioned file names exceeds the maximum number; and selecting a number of oldest sorted versioned file names to purge to reduce the number of versioned file names in the retention index file to reach the maximum number.

18. The system of claim 16, wherein the determining from the retention index versioned files for the source file to purge in response to determining that the retention rule indicates the time limit of versioned files for the source file and the versioned files for the source file do not satisfy the retention rule comprises:

determining whether sorted version file names exceed the time limit according to the timestamp for the sorted versioned file names; and selecting versioned file names in the retention index whose timestamp exceeds the time limit to purge versioned files whose timestamp exceeds the time limit.

19. The system of claim 13, wherein the operations further comprise:

determining from the retention index versioned files for the source file to purge in response to determining that the retention rule specifies a time period and maximum number of versioned files to maintain for the source file within the specified time period and the versioned files for the source file do not satisfy the retention rule.

20. The system of claim 19, wherein the retention rule specifies multiple time periods and one maximum number for each time period to separately maintain versioned files for the source file for different time periods, wherein the determining whether the number of versioned files to maintain for the source file exceeds the specified maximum number is performed for each specified time period, and wherein selecting the number of oldest versioned file names to purge to reduce the number of versioned file names in the retention index file is performed for each specified time period to reach the maximum number specified for the time period.

21. The system of claim 13, wherein the filter program executes in a kernel of an operating system.

22. The system of claim 13, wherein the retention rule identifies a name of one source file to which the rule applies or identifies a source that created the source file to which the rule applies.

23. An article of manufacture comprising a non-transitory computer readable storage medium including code that is executed for processing a request to write to a source file in a storage system that is in communication with a file system, wherein the code is executed to cause operations to be performed, the operations comprising:

intercepting a request from an application or file system user interface to write to a source file in the storage system;

determining whether a retention rule is provided for the source file in response to the write request;

in response to determining that one retention rule is provided for the source file, generating a versioned file name, wherein a versioned file comprises the source file at a point-in-time;

transmitting a command to the file system to copy the source file data to a versioned file having the generated versioned file name;

applying a function to a source file name of the source file to determine a retention index file, wherein the determined retention index file maintains names of versioned files for the source file to which the function is applied;

adding the generated versioned file name to the determined retention index file;

determining from the retention index versioned files for the source file to purge in response to determining that the retention rule indicates a maximum number of versioned files for the source file and the versioned files for the source file do not satisfy the retention rule;

determining from the retention index versioned files for the source file to purge in response to determining that the retention rule indicates a time limit of versioned files for the source file and the versioned files for the source file do not satisfy the retention rule;

transmitting a command to the file system to purge the determined versioned files at the storage system; and transmitting the write to the source file to the file system in response to determining that no retention rule is provided for the source file, wherein the file system applies the write to the source file at the storage system.

24. The article of manufacture of claim 23, wherein the operations further comprise:

deleting the versioned file names for the determined versioned files to purge from the retention index file, wherein the command to purge is issued by transmitting the command to the file system to delete versioned files at the storage system having the determined versioned file names.

25. The article of manufacture of claim 23, wherein the function comprises a hash function, and wherein one retention index may maintain versioned file names for multiple source files to which the function is applied.

26. The article of manufacture of claim 23, wherein the determining from the retention index file the versioned files to purge further comprises:

sorting the versioned file names for the source file in the retention index file ordered on a timestamp included in the versioned file names; and selecting versioned files from the sorted versioned file names to purge.

27. The article of manufacture of claim 26, wherein the determining from the retention index versioned files for the source file to purge in response to determining that the retention rule indicates a maximum number of versioned files for the source file comprises:

determining whether a number of the sorted versioned file names exceeds the maximum number; and selecting a number of oldest sorted versioned file names to purge to reduce the number of versioned file names in the retention index file to reach the maximum number.

28. The article of manufacture of claim 26, wherein the determining from the retention index versioned files for the source file to purge in response to determining that the retention rule indicates the time limit of versioned files for the source file and the versioned files for the source file do not satisfy the retention rule comprises:

determining whether sorted version file names exceed the time limit according to the timestamp for the sorted versioned file names; and selecting versioned file names in the retention index whose timestamp exceeds the time limit to purge versioned files whose timestamp exceeds the time limit.

29. The article of manufacture of claim 23, wherein the operations further comprise:

determining from the retention index versioned files for the source file to purge in response to determining that the retention rule specifies a time period and maximum number of versioned files to maintain for the source file within the specified time period and the versioned files for the source file do not satisfy the retention rule.

30. The article of manufacture of claim 29, wherein the retention rule specifies multiple time periods and one maximum number for each time period to separately maintain versioned files for the source file for different time periods, wherein the determining whether the number of versioned files to maintain for the source file exceeds the specified maximum number is performed for each specified time period, and wherein selecting the number of oldest versioned file names to purge to reduce the number of versioned file names in the retention index file is performed for each specified time period to reach the maximum number specified for the time period.

31. The article of manufacture of claim 23, wherein the code executes in a host system in communication with the storage system over a network.

32. The article of manufacture of claim 31, wherein retention index files are maintained at local storage to the host system and accessed locally to determine versioned files to purge according to retention rules.

33. The article of manufacture of claim 23, wherein the code executes in a kernel of an operating system.

34. The article of manufacture of claim 23, wherein the retention rule identifies a name of one source file to which the rule applies or identifies a source that created the source file to which the rule applies.

* * * * *